May 19, 1931.　　　　　　P. X. RICE　　　　　　1,806,500
TRAIN CONTROL SYSTEM
Filed May 3, 1926　　　　6 Sheets-Sheet 3
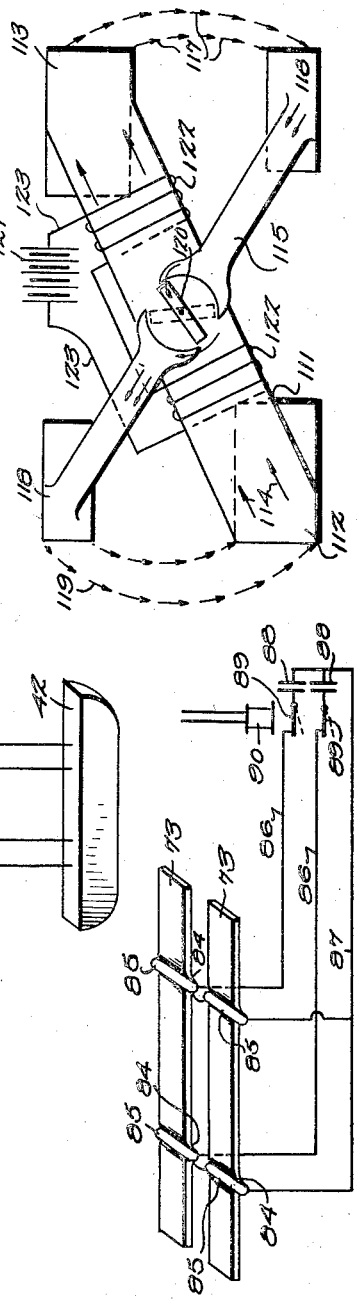
Inventor
PHILIP X. RICE
By
Attorney

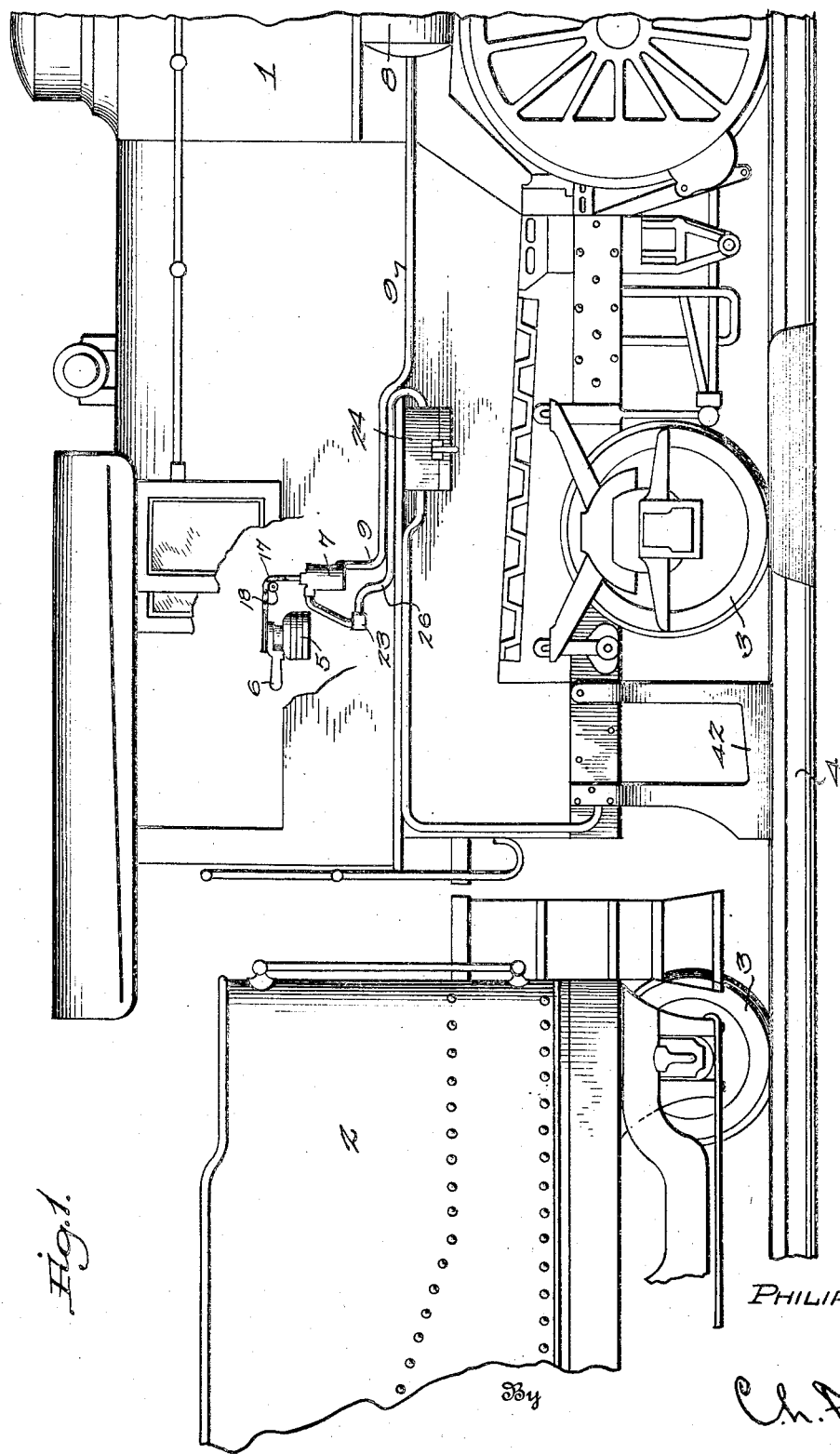

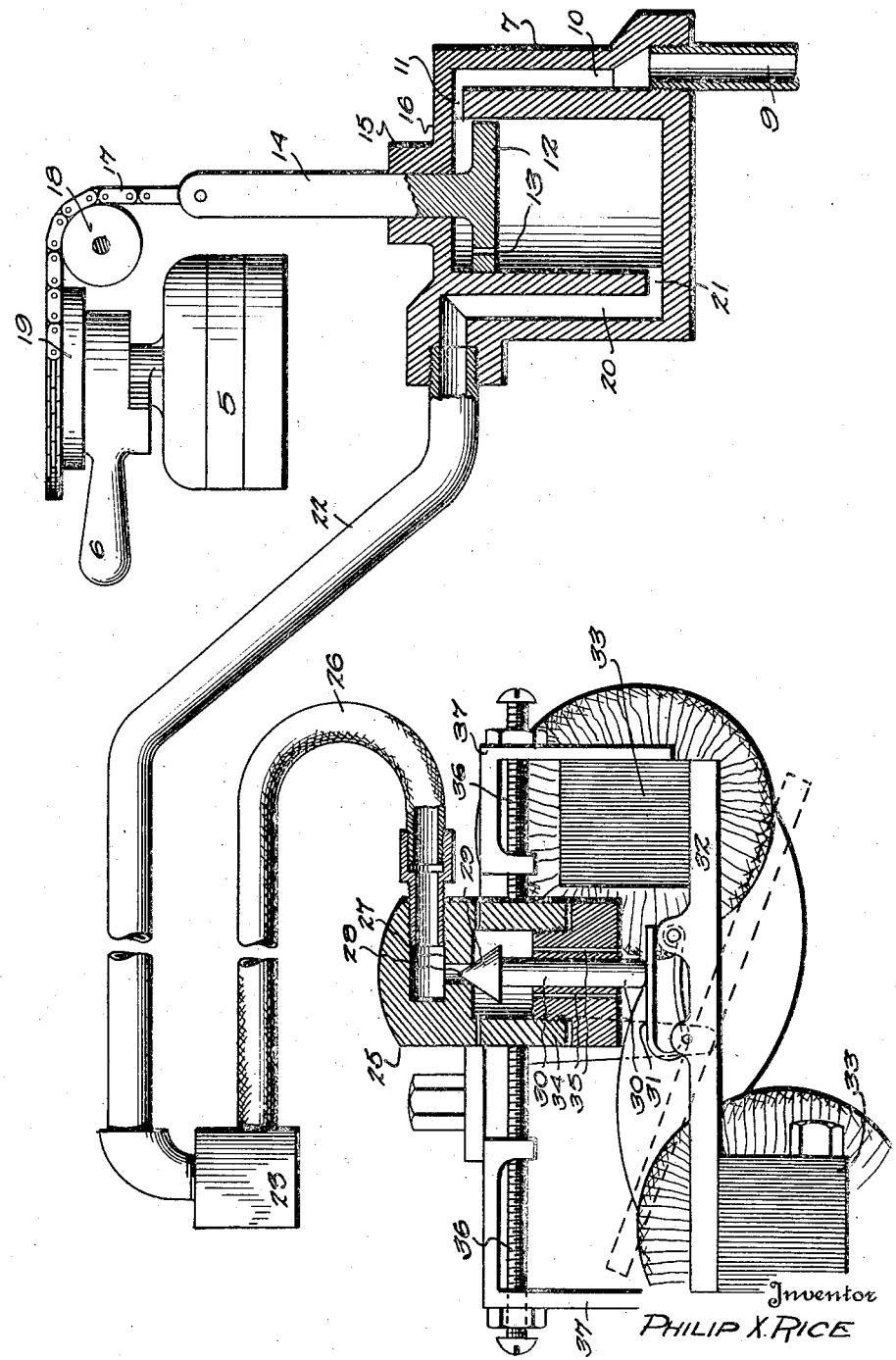

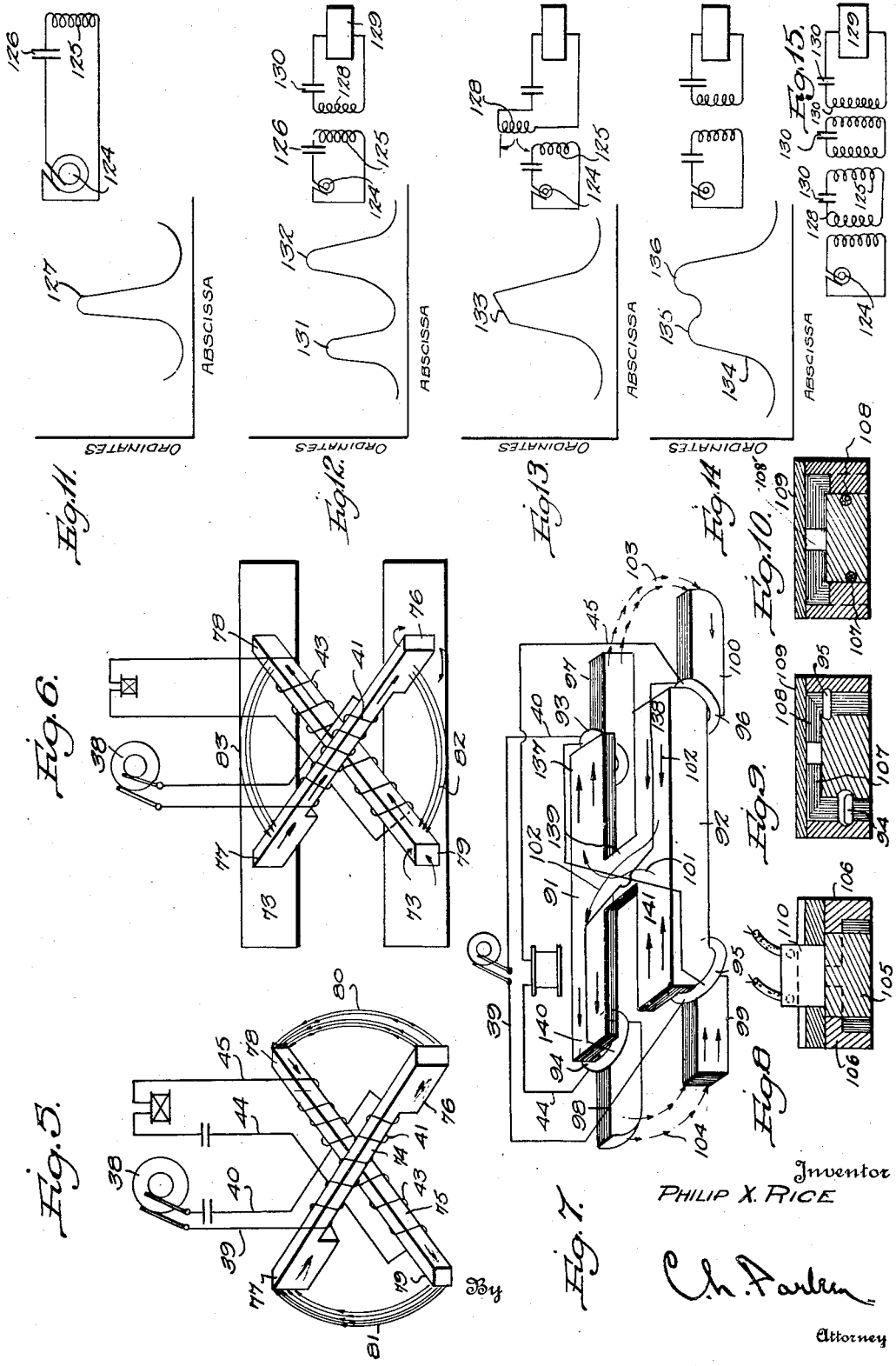

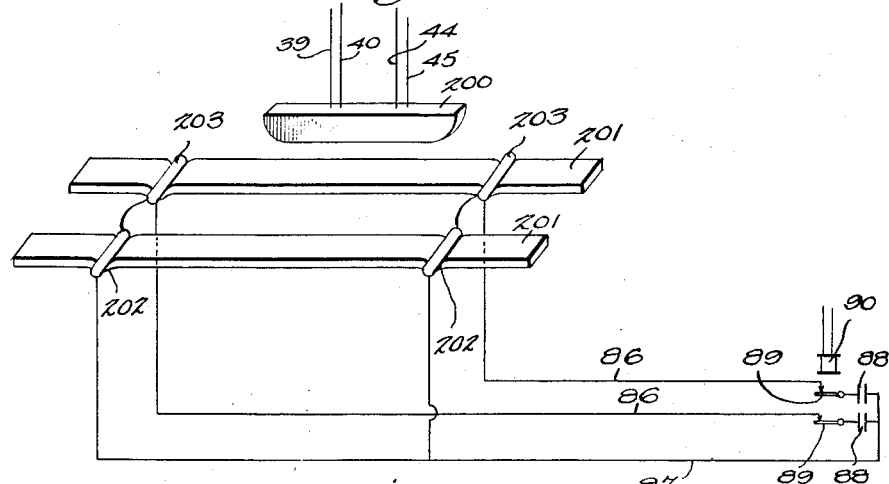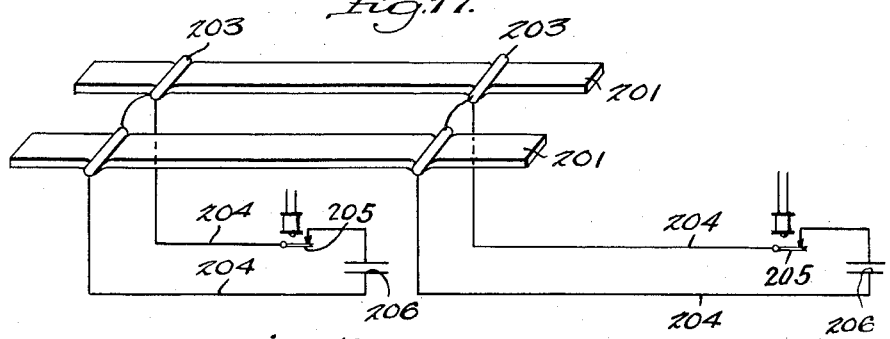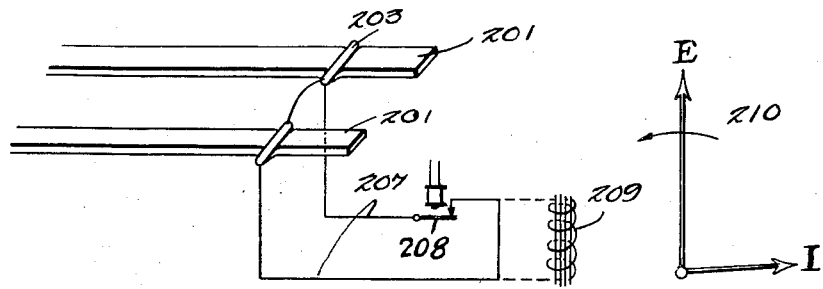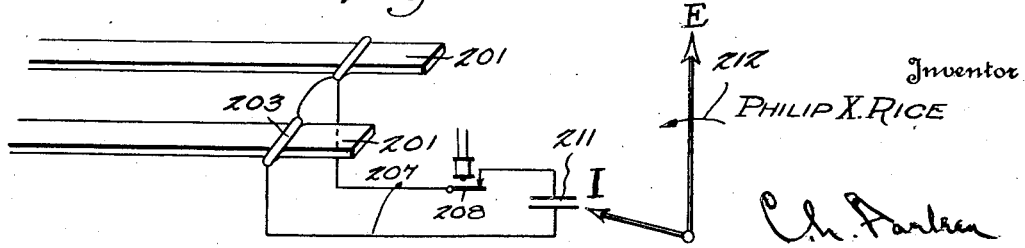

May 19, 1931. P. X. RICE 1,806,500
TRAIN CONTROL SYSTEM
Filed May 3, 1926 6 Sheets-Sheet 6
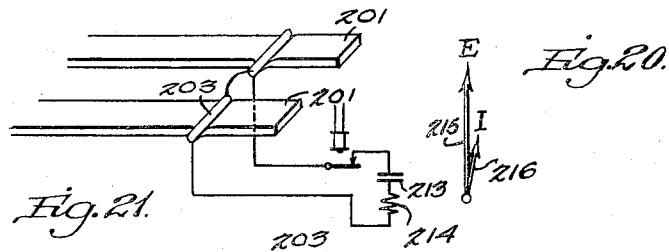
Fig.20.
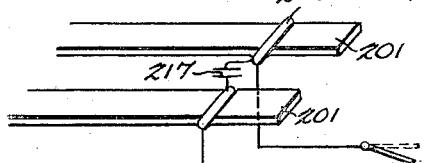
Fig.21.
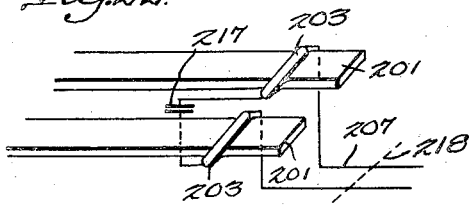
Fig.22.
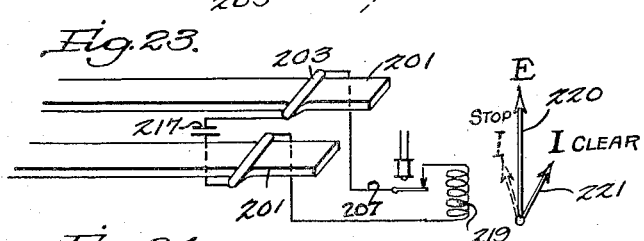
Fig.23.
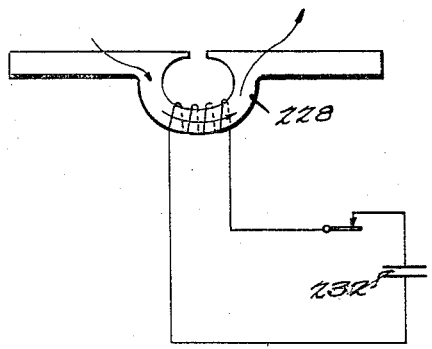
Fig.26.
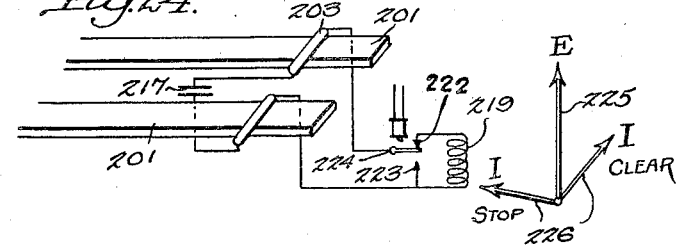
Fig.24.
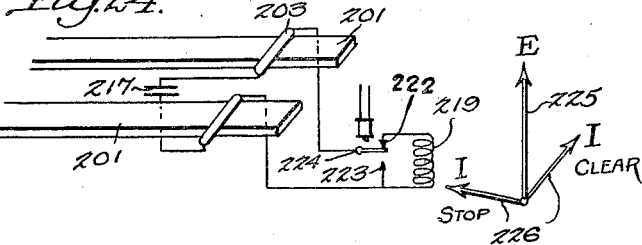
Fig.25.
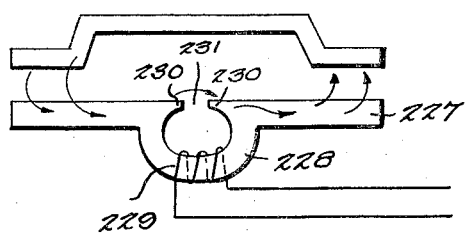
Inventor
PHILIP X. RICE
By
Attorney Patented May 19, 1931

1,806,500

UNITED STATES PATENT OFFICE

PHILIP X. RICE, OF DANVILLE, ILLINOIS, ASSIGNOR TO THE MILLER TRAIN CONTROL CORPORATION, OF STAUNTON, VIRGINIA, A CORPORATION OF VIRGINIA

TRAIN CONTROL SYSTEM

Application filed May 3, 1926. Serial No. 106,473.

This invention relates to train control systems, and more particularly to train control systems of the induction type.

An object of the invention is the provision of a train control system including a receiver mounted on the vehicle having primary and secondary coils arranged so that, normally, sufficient current is delivered to the secondary to maintain a valve or other control member in closed or normal condition, together with track-side apparatus by means of which the flow of magnetic flux through the receiver may be reversed or reduced causing the operation of the valve or other control member.

A further object of the invention is the provision of an induction system by means of which greater effectiveness, traffic facility and simplicity are obtained.

A further object of the invention is the provision of a system having a forestalling circuit which will permit the engineer to forestall the automatic application of the brakes before reaching the stop mechanism on the roadside and which is incapable of being operated after the stop indication has been received.

In the accompanying drawings, I have shown several embodiments of the invention. In this showing:

Figure 1 is a side elevation of a portion of a locomotive and tender showing the invention applied, Figure 2 is a side elevation of the valve and associated mechanism removed from the locomotive, parts being shown in section, Figure 3 is a diagrammatic view of the train and roadside mechanism, Figure 4 is a detail diagrammatic view of the receiver showing a modified form of the invention, Figure 5 is a similar view of the receiver shown in Figure 3 of the drawings, showing the normal path of current through the coils of the receiver, Figure 6 is a similar view showing the path of current when passing over a roadside apparatus under danger conditions, Figure 7 is a diagrammatic view of another type of receiver, Figure 8 is a transverse sectional view of the receiver adjacent one end, Figure 9 is a similar view at a point between the end and the center substantially through the pair of coils arranged at the end, Figure 10 is a similar view adjacent the center of the receiver, Figure 11 is a diagrammatic view of a circuit and the curve indicating the frequency of the current obtained therefrom, Figure 12 is a similar view of a circuit by means of which two resonant peaks are obtained, as shown in the curve, Figure 13 is a similar view of another circuit showing a loose coupling, Figure 14 is a similar view of another circuit showing a medium coupling, Figure 15 is a similar view of a circuit in which a plurality of primaries and secondaries are employed, Figure 16 is a diagrammatic view of the receiver and track-side mechanism showing the coils of the track-side mechanism arranged a greater distance from each other than the distance between the poles of the receiver, Figure 17 is a similar view showing a desired arrangement of condensers, Figure 18 is a diagrammatic view of one end of a track-side mechanism in which inductor coils are utilized for the purpose of obtaining a lagging phase angle when the track-side mechanism is set for permitting the vehicle to pass, Figure 19 is a similar view showing the use of a condenser to secure a leading phase angle, Figure 20 is a similar view showing the use of a resonant condenser and resistance to encourage heavy clear current but to prevent the current from leading, Figure 21 is a similar view showing a condenser arranged within the track-side mechanism between the coils.

Figure 22 is a similar view illustrating the operation when the control wires become short circuited, Figure 23 is a similar view illustrating the use of a reactor coil to neutralize the leading tendency of the condenser, Figure 24 is a similar view showing a slight modification, Figure 25 is a diagrammatic view of the receiver and track-side mechanism showing the use of a magnet by-pass around the choke coil, and Figure 26 is a diagrammatic view of a portion of the track-side mechanism of the type shown in Figure 25.

Referring to Figure 1 of the drawings, the reference numeral 1 designates generally a locomotive, and 2 a tender, each of which is provided with wheels 3 adapted to travel on tracks 4. The ordinary engineer's air brake valve is shown in the cab of the locomotive at 5, and is provided with the usual operating handle 6. A control cylinder 7 is arranged adjacent the valve and this cylinder is connected to the air tank 8 by means of a conduit 9. As shown in Figure 2 of the drawings, the conduit communicates with a passage 10 extending up one side of the cylinder and then communicates with the top through a transverse port 11. A piston 12 is arranged within the cylinder and this piston is provided with a vent 13 by means of which a balanced pressure is normally maintained in the cylinder. The piston is provided with a piston rod 14 projecting through a boss 15 in the cylinder head 16, and a flexible chain 17 is connected to the piston rod. This chain passes over a guide roller 18 and is connected to a drum 19, mounted on the handle 6 of the brake valve. The cylinder is further provided with an outlet passage 20 communicating with the bottom of the cylinder by means of a port 21 and this outlet passage is connected to a pipe or conduit 22 extending to a coupling 23. The actuating mechanism heretofore described is of the type shown in the patent to William B. Murray, No. 1,380,578, granted June 7, 1921, and forms no part of the present invention except in the combination claimed.

The moment of inertia of the armature 32 is small enough to permit movement thereof to open or non-recall position in the very short space of time of approximately .005 (or less) of a second. On the other hand, the moment of inertia is sufficiently great to prevent the armature from moving beyond recall by the normal secondary current of the valve magnet during the deenergized periods of each cycle. At 360 cycles (720 reversals) per second, the deenergized periods of such frequency are of the order of .00001 to .00030 second according to wave shape, etc. Therefore it is obviously practicable to make the armature of such inertia as to respond during the time of current reduction while passing a stop inductor even at high train speeds, and yet be of sufficient inertia to be substantially immune to cyclic variations.

The coupling 23 is connected to a casing 24, having an induction valve 25 arranged therein. As shown, the coupling may be connected to the valve casing by means of a flexible conduit 26, which permits the valve casing to be arranged at any desired point on the locomotive or tender. The valve is provided with a partition 27 having an opening 28 formed therein and a valve member 29 is adapted to engage a seat formed at the bottom of this opening. As shown, the valve is provided with a stem 30, the lower end of which engages a spring 31 carried by a pivotally mounted armature 32. This armature is arranged adjacent two magnets 33 and is adapted to be normally held in the full line position shown in Figure 2 of the drawings, when the magnets are energized. When the magnets become deenergized, the armature assumes the dotted line position and the valve moves by gravity to an open position. As shown, the bottom of the valve casing is closed by a plug 34, having ports 35 through which air or other fluid is adapted to escape when the valve is open. The position of the valve within the valve casing may be regulated by means of adjusting screws 36 which are mounted in suitable frames 37, carried by the casing.

In Figure 3 of the drawings, I have diagrammatically illustrated the locomotive apparatus and circuits by means of which the valve is controlled. As shown in Figure 5 of the drawings, an alternating current generator 38 is arranged on the vehicle and connected by suitable lead wires 39 and 40 to a primary coil 41 carried by a receiver 42 and located at a suitable elevation above the track. The receiver is shown in Figure 1 of the drawings, arranged adjacent the rear of the locomotive. The receiver is also provided with a secondary coil 43 and the ends of this coil are connected to a pair of lead wires 44 and 45. The lead wire 44 is provided with a condenser 46 and is connected to a terminal 47. From this terminal, a wire 48 is connected to the valve magnets 33. The lead wire 45 is likewise connected to a terminal 49 and from this terminal a lead wire 50 is connected to the opposite binding post of the magnets 33. The terminals 51 and 52 are connected to the generator 38 and to the lead wires 39 and 40 of the primary coil of the receiver (see Figure 3). As shown, a condenser 53 is arranged in the lead wire 40.

Suitable means are provided for permitting an engineer to forestall an application of the brakes or to reset the apparatus after an automatic application. As shown, a lead wire 54 extends from the terminal 51 and is connected to a movable contact 55 arranged in the path of a control member or switch 56. This movable contact 55 is adapted to engage either of a pair of spaced contacts 57 and 58 which are in turn connected to a terminal 59 from which a lead wire 60 extends. This lead wire is connected to the terminal 49 and thence to the valve magnets 33 by the wire 50.
From the terminal 52 of the generator, a lead wire 61 is extended and connected to a movable contact 62. This contact is also controlled by the manually operated member 56 and is adapted to engage either of a pair spaced contacts 63 and 64. The contact 64 is connected to ground 65, as indicated, and the contact 63 is connected to a lead wire 66 which extends to the terminal 47. From the terminal 47, a lead wire 67 extends to a zero speed governor 68 preferably of the type shown in my copending application filed August 2, 1924, Serial No. 729,823, and the opposite side of the governor is grounded as at 69. As shown, a condenser 70 is arranged in this lead wire. The governor is adapted to prevent completion of the reset circuit except when the vehicle is in a state of rest. The mercury type of reset governor commonly employed in train control systems of the present type consists of a hollow casing or the like carried by one end of one of the axles of the locomotive, this casing having in its interior a plurality of circularly arranged lifting pockets. The casing is adapted to contain mercury in its lower portion, when at rest, and the pockets are of such size and are so disposed as to catch and raise the mercury from the bottom of the casing faster than it can leak back into the bottom of the casing through leakage ports provided for this purpose. A contact disk is arranged with its lower edge dipping in the mercury in the casing when the locomotive is standing still, but is out of contact with the mercury when the locomotive is moving due to the action of the lifting pockets referred to. The function of the condenser 70 is to improve the power factor by neutralizing the inductive reactance of the valve coil whereby a larger current can be forced through the valve coil than if its circuit were not somewhat resonant. A preferably cylindrical conductor 72 surrounding the wire leading to the governor, is connected by wire 71 to wire 67 and detects any defects in insulation in the vicinity of the concentric conductor.

The track-side mechanism adapted to be used in connection with the receiver 42 consists of iron strips or laminæ 73 which may be arranged in a suitable casing (not shown) and which may be employed in any desired number corresponding to the number of cores in the receiver. For the purpose of stopping the train, it is merely necessary to provide the iron strips shown in Figure 3 of the drawings, which function as indicated in Figure 6. The coils 41 and 43 of the receiver are mounted on suitable cores 74 and 75 and the primary core is provided with poles 76 and 77. The secondary core is likewise provided with poles 78 and 79. As shown in Figure 5 of the drawings, these poles are arranged with the pole 76 of the primary core nearer to the pole 78 of the secondary core than to the pole 79 of the secondary core. Energization of the coil 41 magnetizes the core 74 and magnetic flux passes from pole 76 to pole 78, as indicated by the lines 80. The flux then flows through the secondary core to the pole 79 and thence to pole 77 of the primary core, as indicated by the lines 81. This induces a current in the secondary coil 43 which current retains the valve 29 in closed position. However, if a pair of inert iron plates, such as the members 73 are arranged beneath the poles of the magnet in the manner indicated in Figure 6 of the drawings, the magnetic flux flows from the pole 76 to the pole 79, as indicated by the lines 82, thence through the secondary core in a reverse direction with respect to the normal direction of flux therein, and from the pole 78 to the pole 77, as indicated by the lines 83. Before the secondary flux can be reversed by this effect of cores 73 there must intervene a time when the magneto-motive-force, or magnetic pressure, at secondary pole 78 from primary pole 76 is just equal and opposite to the magneto-motive-force at secondary pole 79 from the same primary pole 76. In this condition of balanced magneto-motive-forces, the secondary core 75 carries no net flux in either direction and thus induces no secondary voltage or valve current.

To permit a vehicle passing over the track element to receive other than a stop signal, it is necessary to provide means for preventing this balance or reversal of magnetism in the secondary core 75. The means for obtaining this result are shown in the track-side circuits, diagrammatically illustrated in Figure 3 of the drawings. As shown, the iron plates 73 are provided with depressions 84, adapted to receive coils 85. These coils are connected to lead wires 86 and 87 which are in turn connected to condensers 88. As shown, the lead wires 86 are provided with movable contacts 89 arranged therein adapted to be controlled by the line relay 90.

In Figure 7 of the drawings, I have shown a slight modification of the receiver construction shown in Figures 5 and 6 of the drawings. In Figures 5 and 6 of the drawings, the cores of the magnets are crossed, as shown. In the construction shown in Figure 7 of the drawings, the principle involved is the same, but the receiver is H-shaped. By means of this construction, the width and weight of the receiver may be reduced. As shown, I provide a pair of parallel members 91 and 92, having coils 93, 94, 95 and 96 arranged adjacent their ends. The parallel members are connected by a transverse number 139. This forms magnetic poles 97, 98, 99 and 100. The coils 93 and 95 are connected to the lead wires 39 and 40 of the primary circuit and are connected to each other by suitable wiring as shown in Figure 7. The flux is thus caused to follow the direction indicated by the arrows 101 and crosses over the member 92 to the member 91. The coils 94 and 96 are similarly connected to the lead wires 44 and 45 of the secondary circuit and are connected to each other as shown in Figure 7. The path through the H-shaped receiver is thus from the pole 99 to the pole 97, then through the path designated by the arrows 103 to the pole 100, thence to the pole 98 and thence through the path designated by the arrows 104 to the pole 99. This is the normal circuit corresponding to the normal circuit of the crossed receiver, as shown in Figure 5 of the drawings and is adapted to be reversed in the same manner, as indicated in Figure 6 of the drawings.

The mechanical construction of the H-shaped receiver is shown in the sectional views 8, 9 and 10. As shown, a wooden block or keel extends throughout the length of the receiver substantially centrally thereof and the coils are arranged in suitable recesses adjacent each end, as shown in Figure 9 of the drawings. Outside the coils, there are provided wooden side members 106, having grooves for the reception of the cores and these grooves are open at the bottom. Adjacent the center, the keel is provided with crossed grooves through which the wires 107 and 108 of members 91 and 92 extend to cause the current to flow across the receiver. The device is provided with a suitable cover 109 and a terminal box 110 is arranged on one end and is adapted to receive the lead wires 39, 40, 44 and 45.

Another form of receiver is shown in Figure 4 of the drawings. In this form, either a permanent magnet of the permanent hard steel type or an electro-magnet 111 is employed. This magnet is provided with poles 112 and 113, and flux flows through the magnet as indicated by the arrows 114. A secondary core 115 is arranged across the primary magnet, as shown, and provided with a pole 116 adjacent the pole 113 of the primary magnet. The flux thus passes over the pole 113 to the pole 116, as indicated by the arrows 117, and thence through the secondary core 115 to its opposite pole 118. From the pole 118, the flux flows to the pole 112, as indicated by the arrows 119. Any magneto responsive device may be arranged in the core 115, as indicated at 120 and connected to suitable apparatus to be controlled (not shown). If the core 111 is part of an electro-magnet, a suitable source of current 121 is provided and is connected to coils 122 arranged on the core by lead wires 123.

Referring to Figures 11 to 15 of the drawings, Figures 11 shows a simple tuned circuit connected to a generator or source of current 124, and having a coil 125 and a condenser 126 arranged therein. In these figures the abscissa represent frequency and the ordinates represent current. The condenser neutralizes the reactance of the coil 125 at some particular frequency. The curve shown indicates that the current is not appreciable until some approximate resonancy has been reached when the current rises up sharply to a very high value, as indicated by the peak 127. However, the current drops again to practically zero due to the fact that the frequency is increased only a very small amount. The practical range of frequencies which could be operated with railroad service by such a closely tuned circuit would, therefore, be very narrow.

In Figure 12 of the drawings, I have shown a circuit by means of which two resonant peaks are obtained. In this showing, the generator 124 supplies current to a primary coil and the circuit is provided with a condenser 126 as shown in Figure 11 of the drawings. The primary coil, however, is inductively connected to the secondary coil 128 arranged in a circuit carrying a load 129 and having a condenser 130. The load in the present instance would be the induction valve shown in Figures 1, 2 and 3 of the drawings. In this arrangement, the primary circuit has of itself, a certain natural frequency. The secondary circuit also is tuned to its own natural frequency. If these two natural frequencies are made equal, it will be found that when coupled tightly, as shown in Figure 12 of the drawings, one of the circuits will be resonant at a slightly lower frequency, as indicated by the peak 131 and the other circuit will be resonant at a frequency slightly higher, as indicated by the peak 132, than the natural frequency of either. This matter may be explained by the interaction between the primary and secondary circuits, as the tight coupling causes the secondary to affect the inductance of the primary circuit. In Figure 13 of the drawings, I have shown a similar circuit in which the coils 125 and 128 are loosely coupled. The interaction between the two circuits is thus weak and each circuit is, therefore, more clearly able to be resonant at its own independent frequency. The resultant current flow is shown by the curve having one resonant peak 133 which is considerably broader than the peaks shown in Figures 11 and 12 and which would, therefore, permit a generator to be run longer without adjustment of its governor.

Figure 14 also shows the same circuits as Figures 12 and 13, except that the coupling is made medium, providing a peak 134 having a double hump 135-136. With medium coupling the interaction between primary and secondary is sufficient to cause resonance at slightly different frequencies and yet the peaks overlap enough to avoid dropping the value between peaks. This principle is more fully described in various technical magazines dealing with radio communication, wired wireless, band pass filters, etc. It will be noticed, however, that these peaks are so close together that the low point is still high enough to maintain the induction value in closed position and that the permissible range of frequencies has been still further broadened. This method of broadening the permissible range of frequencies may be employed throughout a plurality of circuits, as shown in Figure 15 of the drawings, in which each secondary coil 128 is arranged in a circuit provided with condenser 130 and is provided with a primary coil 125, the last circuit being connected to the load 129.

Referring to Figure 16 of the drawings, I have shown a receiver 200 substantially the same as the receiver shown in Figure 3 of the drawings and adapted to be connected to the generator and the control valve in the same manner as indicated. The track-side mechanism consists of iron strips or laminæ 201 similar to the construction shown in Figure 3 of the drawings and provided with depressions 202 for the reception of coils 203. Particular attention is called to the fact that the coils of the track-side mechanism are spaced from each other a greater distance than the distance between the poles of the receiver. The coils 203 are connected to condensers 88 in the manner heretofore described and are adapted to be open circuited by the relay switches 89 controlled by the line relay 90 in the manner heretofore described.

In Figure 17 of the drawings I employ a similar construction in which the coils at each end of the track-side mechanism are connected to conducting wires 204 having switches 205 arranged therein and adapted to be controlled by a relay in the usual manner. These conducting wires are provided with condensers 206 which are adapted to give a greater amount of clear current when the switches 205 are closed by neutralizing the impedance of the coils 203.

Another modification of the invention is shown in Figure 18 wherein the coils are connected to lead wires 207 having a suitable switch 208 arranged therein and an inductive coil 209 is connected to the wire 207. In this embodiment the inherent inductive reactance of the coil is employed for the purpose of creating a lagging phase angle for clearing as indicated by the arrow 210.

In another embodiment of the invention (Figure 19) a condenser 211 may be employed as a phase shifter to cause a leading phase angle as indicated by the arrow 212 for stopping the train.

As shown in Figure 20 of the drawings, a condenser 213 may be employed in circuit with suitable resistance 214 for the purpose of encouraging a heavy clear current and at the same time preventing the current from leading as indicated by the arrows 215 and 216.

As shown in Figure 21 of the drawings, the condenser may be arranged within the track-side mechanism between the coils 203 as indicated at 217. When so arranged short circuiting of the lead wires 207 does not disconnect the condenser as will be apparent from an inspection of Figure 22 of the drawings. In this figure a short circuit is indicated at 218 and it will be seen that the condenser 217 is still connected to the coils 203.

The internally arranged condenser 217 may be employed in connection with an inductor coil 219 arranged in the lead wires 207 as shown in Figure 23 of the drawings, to neutralize or more than neutralize the phase leading and brake setting tendency of the condenser as indicated by the arrows 220 and 221, the position of the arrow 221 being determined by the relative strength of the condenser 217 and the coil 219.

The results shown in Figures 20 and 23 may be obtained by arranging coil 219 as shown in Figure 24 of the drawings with contacts 222 and 223 spaced on opposite sides of switch 224 so that when the switch is lowered the coil will be disconnected and the condenser still arranged in the circuit of the coils 203. The effect on the current is illustrated by the arrows 225 and 226.

In Figures 25 and 26 of the drawings, I have shown the track-side member 227 provided with depressions 228 in which coils 229 are arranged. The material from which the track-side mechanism is formed is extended over the coil as at 230 to provide a relatively small gap 231. This produces a magnetic by-pass around the choke coil which partially shields the inductor coil from the receiver flux when the track-side mechanism is set for a stop indication and causes more effective operation of the track-side mechanism. The by-passing effect of this construction can be overcome in order that a clear indication may be provided by employing a condenser 232 as illustrated in Figure 26 of the drawings. This arrangement also increases the reactance, and thereby reduces the short circuit current when the coil 229 or wires connected thereto become crossed or otherwise accidentally connected.

The operation of the device is as follows:

Alternating current is supplied from the generator 38 to the primary coil 41 of the receiver, causing magnetic flux to emerge alternately from the two poles 76 and 77 of the primary core 74. Normally, this flux flows across the air gaps between the primary and secondary poles in the manner shown in Figure 5 of the drawings, completing a figure 8 path and inducing a current in the secondary core which holds the valve 29 in closed or proceed position. When over an inductor set for a stop signal or with the contacts 89 in an open position, the iron plates 73 of the inductor cause the magnetic flux to flow from the pole 76 of the primary core to the pole 79 of the secondary core in the receiver, as shown in Figure 6 of the drawings. This reverses the direction of flux in the secondary core. Reversal of secondary flux reverses the flow of current in the valve circuit, but in course of reversal, this current goes through a period of zero value which permits the valve to open. If the flux and secondary valve current do not quite reverse, as when the receiver is at a considerable height above the track element, the secondary is in a balanced magnetic condition and generates no voltage. When the flux does reverse, a reverse phase voltage is induced in the secondary but a corresponding valve current does not flow because the proximity of the inductor de-tunes the secondary-valve circuit. As actually connected through the condenser 46, the reverse current does not rise to an appreciable value and therefore the practical effect is the reduction to zero current. The diminution of the current may be controlled by the distance between the receiver poles and the track element. In actual practice, a 50 per cent. reduction of the current in the secondary or induction valve circuit for .005 seconds will cause the valve to open and with approximately zero current, the time required is much smaller. When the valve is opened, the pressure in the cylinder 7 is reduced in the manner described in the Murray patent heretofore referred to, and the piston moves downwardly, causing the piston rod 14 and the chain 17 to move downwardly and turning the handle of the engineer's air brake valve to apply the brakes.

The condensers 46 and 53 are employed to improve the power factor of the engine primary and secondary circuits and may be arranged in the valve box of the locomotive. De-tuning of these circuits assists in the reduction of valve current toward zero when a stop signal is received from the inductor and prevents appreciable rise of valve current beyond zero if the inductor causes a complete reversal of flux in the secondary circuit.

The circuit arrangement from the terminals 51 and 52 in the valve box will be apparent. These terminals are connected to the generator 38 by suitable lead wires as shown in Figure 3, and are connected to the coil 41 by the wires 39 and 40. The secondary coil 43 of the receiver is connected to the magnets 33 by the wires 44, 48, 50 and 45, through the terminals 47 and 49, respectively. Approximately two amperes of current are required in the generator in normal operation. As shown in Figures 8 to 10 of the drawings, the poles of both the primary and secondary cores of the receiver project downward to the bottom of the case and the cover 109 protects the cores from damage.

In the operation of the forestalling circuit, the current flows from terminal 51 through wire 54 to contact 55. To forestall, the manually controlled member 56 is moved to the left in Figure 3 of the drawings, connecting the movable contact 55 to the contact 57. Current then flows from the terminal 59 through the wire 60 to the terminal 49, through wire 50 to the valve magnets 33, through wire 48 to terminal 47, through wire 66 to contact 63, through movable contact 62 to wire 61, and thence to the terminal 52. When the forestalling button is pressed, the alternator is connected to the valve and the latter is retained in its proceed position, regardless of the change of flux in the receiver. The current received from the generator is sufficient to retain the valve in closed position if the engineer wishes to prevent the automatic operation of the brakes but is not sufficient to reset the valve once the receiver 42 comes in proximity to the inductor on the track. The reactance of the valve magnets 33 is large, and unless this reactance is offset in some manner, the generator or voltage is not able to force enough current through magnets 33 to attract the armature 32 if the latter be at a distance from the poles of magnets 33.

The induction valve is so designed that once opened, it cannot be restored to running position by the secondary circuit or by the forestalling circuit. After an automatic application, the train must be brought to a full stop, or to a minimum speed, where speed control is employed. To provide means for resetting the circuit without compelling the engine man to leave the cab, it is necessary to employ a governor and the governor 68 shown is adapted to complete a circuit to the ground 69 when the train is in a state of rest. In the reset circuit, current follows from terminal 51 through wire 54, movable contact 55 to the contact 58. The current then passes to the terminal 59 and follows the same path through the valve as in the forestalling circuit to the terminal 47. The current then passes through wire 67, condenser 70, and governor 68 to ground 69. By the use of the condenser 70, this resonant circuit forces several times the normal value of the current through the valve and restores the armature 32 after which the brake valve handle 6 may be moved to release and running positions. From the ground 69, current flows through the locomotive to ground 65, thence to contact 64, movable contact 62, and wire 61 to terminal 52.

The by-pass around the condenser 70 is for the purpose of detecting grounds on the conductor between the condenser and the governor, which would permit the reset circuit to be closed before the train comes to a complete stop or to the minimum speed for which the governor is set. It will be apparent that a ground on the circuit beyond the condenser, if grounded on the engine frame, would permit the reset circuit to operate at higher speeds. However, the guard ring or cylinder 72 is interposed between the reset governor wire and the frame of the engine so that the guard ring would be the first member to become grounded in case of defect or wear at this point, and a ground on said guard ring 72 short circuits the condenser 70 and thus detects said ground by preventing successful reset operation when attempted. As the conductor 72 is arranged concentric with, or around, the wire 67, it is apparent that grounding of the wire beyond the condenser cannot occur without also grounding the conductor and thus cutting out the condenser.

In the operation of the track element, it is merely necessary to provide two inert stacks of iron laminæ designated by the reference numeral 73 to cause the reversal in the direction of the flow of magnetic flux, as indicated in Figure 6 of the drawings. It is therefore unnecessary to supply any current to the track-side current. To permit the receiver to pass over th inductor without applying the brakes, the coils 85 are provided and connected to the condensers 88 when the contacts 89 are closed by the line relay 90, indicating a clear condition in the block. The voltage induced in the coils of the inductor, charges the condenser which reflect the energy to the coils of the inductor, and thence to the receiver on the engine, maintaining the normal valve current in the receiver, and the engine circuits. Condensers 88 have less reactance than the remainder of the circuits and therefore the clearing current is of a lagging phase angle. All reflected energy of a lagging phase angle has a clearing tendency. This will be understood by reference to Figures 5, 6 and 18, it being noted that a track element of lagging phase angle causes the flux received in the track element from the primary poles to lag, and reflector 209 reflects energy at a phase angle lagging with respect to its charging voltage and therefore doubly late with respect to the secondary flux normally received laterally from the primary poles. It should be remembered that the track element cores 201 or 73 transmit magnetic forces 82 and 83 longitudinally into the opposite ends of the secondary system in contrast to the normal lateral forces 80 and 81. It is plain that a partial reversal of the time-phase of the longitudinally reflected magnetic force simultaneously with the geometrical reversal due to the redirecting function of the longitudinal feature of the track element provides for a successful additive combination (vectorially) of the lateral and longitudinal magnetic forces when in proximity to a clear track element; and the net magneto-motive forces in the secondary system determines the magnitude of secondary flux, and therefore, of the secondary or valve current. It is not necessary that the angles of lags be great; fairly small angles of lag though not of a boosting or naturally additive nature, need not detract appreciably from the normal lateral force. For example, a shift of 30 plus 180 plus 30 degrees provides a "reflected" vector only 120 degrees from the normal lateral force, and if these vectors be of equal magnitude there will be no reduction in the net secondary force. In fact, much smaller angles may be employed without allowing the brakes to become applied because the normal valve current greatly exceeds that required to hold the valve closed and also because the lateral force actually increases when over clear track elements. However, the clearing tendency may be insufficient if the current quantity is insufficient, as in event of an accidental or malicious short circuit between wires 86 and 87, and thus the train would be stopped as an indication of such defect in insulation. The condenser is necessary for the purpose of securing sufficient clear current quantity. The utmost celaring effect is obtained when the condenser provides slightly lagging current of magntiude as nearly equal to the peak of resonance (unity power factor or in phase) as possible because this is the condition in which the strongest oscillations or reflections are obtained, and it is also the condition in which the primary delivers the greatest possible lateral forces 80 and 81 to the secondary system. In Figure 18, the most lagging phase angle is inherent whether reactor 209 is employed or not but the current quantity would be too small to successfully avoid stopping the train.

Should the condenser to too small, as in Figure 19, the inductor current would not clear, but would actually provide a stopping effect as shown by the vector diagram. Near resonance, but with leading phase angle, this stopping effect is powerful. Should a short circuit occur in one of the coils 85 or between the wires 86 and 87, the condenser of that circuit will be non-effective and there will be but a small return of energy to the engine. If the contacts 89 were open to stop the train, a short circuit would not prevent the inductor from reversing the flow of current in the secondary circuit of the engine, and thus stopping the train. All of the condensers shown tend to impart a stop or leading phase angle to the current of the track element and to the flux of the receiver secondary because a leading current in the track element compensates for the lagging tendency of the uncontrolled iron parts of the train control system. For example, the coils 85 on the track element cores are so far apart that their ranges of action do not extend with full effect over the entire length of cores 73, but the leading tendency in the vicinity of coils 85 may offset the lagging or de-tuning effect of the remote portions of cores 73. As a result, longitudinal forces 82 and 83 at track elements of leading current are not only of large magnitude but also of very effective phase angle relationship in opposition to the lateral forces 80 and 81, and therefore the net force is approximately zero and the valve current correspondingly low. If the inductance of the inductor, coils or external reactor predominate the net result will be a clear or lagging phase angle. In either case, the use of an inductor condenser augments the quantity of inductor current and secondary magneto motive force considerably, whereby more powerful clear and more powerful stop effects can be had. Therefore, it is sometimes desirable to so connect a condenser or condensers to the inductor circuits that said condensers will be included in the inductor circuit whether a clear or a stop indication is to be given, as in Figures 22 and 24, condenser 217 having a reactance exceeding the reactance of the inductor coils 203.

Figure 21 shows a method of stopping trains with a stop circuit including stop condenser 217 closed by the back contact of a relay switch when in the stop position. Figure 22 provides the same stop effect in event of a short circuit 218. Condensers 217 in all of the drawings must have more reactance than the inductor coils 203.

Figure 23 shows a method of clearing an inductor circuit having a condenser 217 of greater reactance than the inductor coils 203. The reactor 219 causes the combined inductive reactance to exceed the capacity reactance, in which case the phase angle of inductor current and of the receiver secondary flux has a clear lagging phase angle.

Figure 24 combines the leading stop feature of Figures 21 and 22, and the lagging clear feature of Figure 23. The vector diagram shows the vector and quantitative relation between a leading stop current and a lagging clear current in reference to inductor voltage E.

For semi-continuous control, inductors may be placed at frequent intervals along the track.

The apparatus is practically immune to interference from solid iron bodies along the track. Rails, bridge members, water troughs, tie plates, switch plates, and the like, are subject to eddy currents, which neutralize much of their magnetic permeability at the frequency employed in the operation of the apparatus. Moreover, bodies arranged transversely of the track assist the normal flow of flux. This can be explained by citing the shielding effect of solid metal as compared with the absence of shielding when laminated iron cores are used. In radio and other arts, copper or other low resistance shields surround coils to prevent or to greatly reduce passage of alternating magnetism into or out of the region bounded by the shield. Solid iron also functions as a shield, though not so effectively as copper. With the 360 cycle frequency which may be employed with the present apparatus, the shield effect of eddy current paths in solid iron is considerable and is valuable in that the track elements may be placed level with the rails, and the receiver discriminates between the laminated iron cores of the track element and solid rails, etc. At a frequency as low as 60 cycles, other systems of train control with which I am familiar find it necessary to elevate the track element above the rail level to obtain discrimination between rails and track elements.

In the operation of the receiver shown in Figure 7 of the drawings, the same principle is employed and the current normally flows in a figure 8 path, as indicated by the arrows. When passing over an open circuited inductor, the magnetic flux flows from the primary pole 97 to the secondary pole 98, thence through the secondary in a reverse direction to the pole 100, thence to the pole 99 of the primary core, and thence through the primary core. This is substantially the same as illustrated in Figure 6 of the drawings, in connection with the cross balance receiver to produce the same net result.

With the receiver of the type shown in Figure 4 of the drawings, wherein a permanent hard steel magnet or electro-magnet is employed, the magnetic flux is reversed in the same manner to actuate an instrument, such as a compass 120, or other polarized device for the purpose of moving it to a different position as shown in dotted lines, and thus open the valve 29, or any other apparatus, to control the operation of the train.

The circuits shown in Figures 11 to 15 of the drawings merely indicate different methods of obtaining a broader resonant peak so that the generator would not have to be adjusted or regulated as frequently for frequency. This phenomenon is well known to radio and telephone engineers and is employed to obtain similar results in radio telephony.

It is to be understood that the form of the invention herewith shown and described is to be taken as a preferred example of the same, and that various changes in the shape, size, and arrangement of parts may be resorted to without departing from the spirit of the invention or the scope of the subjoined claims.

I claim:

1. In a train control system, a car-carried receiver having a plurality of magnetic paths normally of unequal reluctance, a normally energized primary winding on the receiver urging flux through said paths, a secondary winding included in both of said magnetic paths, a control device in circuit with said secondary winding, and trackway means tending to change the relation of the reluctances of said paths to at least momentarily reduce said flux to substantially zero through said secondary winding.

2. In a train controlling system, a source of alternating current, a receiver carried by the vehicle, a primary coil mounted on said receiver and connected to said source of current, a secondary coil arranged in said receiver whereby the magnetic flux from said primary coil will induce a secondary current in said secondary coil, a circuit connected to said secondary coil, train controlling mechanism arranged in said circuit, and normally inert track elements arranged at spaced intervals and tending to reverse the direction of flow of said magnetic flux when the receiver is over said track element whereby the current in said scondary circuit will be reduced.

3. In a train controlling system, a source of alternating current, a receiver carried by the vehicle, a primary coil mounted on said receiver and connected to said source of current, a secondary coil arranged in said receiver whereby the magnetic flux from said primary coil will induce a secondary current in said secondary coil, a circuit connected to said secondary coil, train controlling mechanism arranged in said circuit, normally inert track elements arranged at spaced intervals and tending to alter the direction of flow of said magnetic flux when the receiver is over said track element whereby the current in said secondary circuit will be reduced, and controllable electrical members connected to said track elements and adapted to influence the magnetic flux received in said track elements to prevent the altering of the secondary flux in said receiver when said electrical members are in operative position.

4. In a train controlling system, a source of alternating current on the vehicle, a receiver carried by the vehicle, said receiver comprising a primary core and a secondary core geometrically crossed, one pole of said secondary core being arranged closer to a pole of the primary core than to the other pole of the primary core, said cores being provided with coils, the coil of said primary core being connected to said source of alternating current whereby magnetic flux will normally flow from one pole of said primary core to the adjacent pole of the secondary core, through the secondary core and then to the remaining pole of the primary core to induce a current in said secondary coil, and normally inert track elements arranged at spaced intervals along the roadside and adapted to reverse or reduce said magnetic flux through said secondary core.

5. In a train controlling system, a source of alternating current on the vehicle, a receiver carried by the vehicle, said receiver comprising a primary core and a secondary core geometrically crossed, one pole of said secondary core being arranged closer to a pole of the primary core than to the other pole of the primary core, said cores being provided with coils, the coil of said primary core being connected to said source of alternating current whereby magnetic flux will normally flow from one pole of said primary core to the adjacent pole of the secondary core, through the secondary core and then to the remaining pole of the primary core to induce a current in said secondary coil, normally inert track elements arranged at spaced intervals along the roadside and tending to reverse the direction of flow of magnetic flux through said secondary core when the receiver is over a track element, and controllable electrical members connected to said track elements and adapted to render said track elements inoperative.

6. A device constructed in accordance with claim 1 wherein said trackway means consists of a plurality of members of magnetizable metal adapted to direct magnetic flux from said receiver longitudinally of the track.

7. A device constructed in accordance with claim 1 wherein said trackway means consists of a member of magnetizable metal adapted to direct magnetic flux from said receiver longitudinally of the track, a coil arranged on said member, and a traffic controlled circuit including said coil, said circuit having inductance and capacity.

8. A device constructed in accordance with claim 1 wherein said trackway means consists of a member of magnetizable metal adapted to direct magnetic flux from said receiver longitudinally of the track, a coil arranged on said member, a traffic controlled circuit including said coil, said circuit having inductance, and a condenser arranged in said circuit and tending to neutralize the reactance of said inductance.

9. A device constructed in accordance with claim 1 wherein said trackway means consists of a member of magnetizable metal adapted to direct magnetic flux from said receiver longitudinally of the track, a coil arranged on said member, and a traffic controlled circuit including said coil, said circuit having inductance and capacity, said inductance having its reactance adapted to allow a lagging clear phase angle in the traffic controlled circuit and in the receiver secondary flux.

10. A device constructed in accordance with claim 1 wherein said trackway means consists of a member of magnetizable metal adapted to direct magnetic flux from said receiver longitudinally of the track, a coil arranged in said member, a traffic controlled circuit including said coil, said circuit having inductance, and a condenser arranged in said circuit, said condenser being adapted to allow a leading stop phase angle in the traffic controlled circuit and in the receiver secondary flux.

11. A device constructed in accordance with claim 1 wherein said trackway means consists of a member of magnetizable metal adapted to direct magnetic flux from said receiver longitudinally of the track, a coil arranged on said member, and a traffic controlled circuit including said coil, said circuit having inductance and capacity, said capacity comprising a condenser arranged near said track element and said inductance comprising an external inductive reactor arranged near the control member of said traffic controlled circuit, the reactance of said condenser being greater than the reactance of said coils and less than the combined inductive reactance of said traffic controlled circuit.

12. A device constructed in accordance with claim 1 wherein said trackway means consists of a member of magnetizable metal adapted to direct magnetic flux from said receiver longitudinally of the track, a coil arranged on said member, a traffic controlled circuit including said coil, said circuit having inductance and capacity, said capacity comprising a condenser arranged near said track element and said inductance comprising an external inductive reactor arranged near the control member of said traffic controlled circuit, the reactance of said condenser being greater than the reactance of said coils and less than the combined inductive reactance of said traffic controlled circuit, and a covering of a metal of low reluctance partially surrounding said track element coil to increase said reactance.

13. In a train controlling system, a source of alternating current on the vehicle, a receiver carried by the vehicle, said receiver comprising a primary core and a secondary core, coils arranged on said cores, the coil of said primary core being connected to said source of alternating current, an electromagnetic valve arranged on the vehicle and connected to the coil of said secondary core, said cores being so arranged that the magnetic flux from said primary core will flow through said secondary core in a given direction, and track-side means tending to reverse the direction of flow of said flux whereby the current value in said secondary coil will be reduced and said valve will be opened.

14. In a train controlling system, a source of alternating current on the vehicle, a receiver carried by the vehicle, said receiver comprising a primary core and a secondary core, coils arranged on said cores, the coil of said primary core being connected to said source of alternating current, an electromagnetic valve arranged on the vehicle and connected to the coil of said secondary core, said cores being so arranged that the magnetic flux from the primary core will normally flow through said secondary core in a given direction, track-side means tending to reverse the direction of flow of said flux whereby the current value in the secondary coil will be reduced and said valve will be opened, and means for rendering said track-side means inoperative.

15. In a train controlling system, a source of alternating current on the vehicle, a receiver carried by the vehicle, said receiver comprising a primary core and a secondary core, coils arranged on said cores, the coil of said primary core being connected to said source of alternating current, an electromagnetic valve arranged on the vehicle and connected to the coil of the secondary core, said cores being so arranged that the magnetic flux from the primary core will normally flow through said secondary core in a given direction, track-side means tending to reverse the direction of flow of said flux, and a manually controlled forestalling circuit connecting the source of alternating current to the electro-magnetic valve whereby said track-side means may be rendered inoperative.

16. A device constructed in accordance with claim 15 wherein the current value of said forestalling circuit is sufficient to retain said electro-magnetic valve in closed position and is insufficient to reset said valve.

17. In a train controlling system, a source of alternating current on the vehicle, a receiver carried by the vehicle, said receiver comprising a primary core and a secondary core, coils arranged on said cores, the coil of said primary core being connected to said source of alternating current, an electromagnetic valve arranged on the vehicle and connected to the coil of said secondary core, said cores being so arranged that the magnetic flux from the primary core will normally flow through said secondary core in a given direction, track-side means tending to reverse the direction of flow of said flux, and a manually controlled reset circuit connecting the source of current to the electro-magnetic valve for resetting said valve.

18. A device constructed in accordance with claim 17 wherein a governor is arranged in said reset circuit to prevent said valve from being reset until the speed of the train is reduced to a predetermined point.

19. A device constructed in accordance with claim 17 wherein a condenser is arranged in said reset circuit to raise the current valve sufficiently to permit resetting of said valve.

20. A device constructed in accordance with claim 13 wherein said primary and secondary circuits are provided with condensers.

21. In a train controlling system, a source of alternating current on the vehicle, a receiver carried by the vehicle, said receiver comprising a primary core and a secondary core, coils arranged on said cores, each pole of said primary core being in substantial longitudinal alinement with a pole of the secondary core, the coil of said primary core being connected to said source of alternating current, train controlling mechanism arranged on the vehicle and connected to the coil of said secondary core, said cores being so arranged that the magnetic flux from the primary core will normally flow through said secondary core in a given direction, track-side elements arranged at spaced intervals along the roadway, said track-side elements comprising longitudinally extending members of magnetizable metal adapted to aline with said longitudinally alined poles of the receiver, and coils mounted on said members and spaced from each other a greater distance than the distance between said poles.

22. In a train control system, a car-carried receiver having a plurality of magnetic paths normally of unequal reluctance, a primary winding on the receiver normally energized with alternating current, tending to send flux through said paths, a secondary winding included in both of said magnetic paths, a control device in circuit with the secondary winding, and trackway means for varying and at least momentarily equalizing the relative reluctances of said paths.

23. In a train control system, a receiver, a normally energized primary winding on the receiver for producing flux, a secondary winding on the receiver, a control device in circuit with the secondary winding, two partial magnetic paths of unequal reluctance furnished by the receiver and each including the secondary winding, and tending to cause flux produced by the primary winding to flow through the secondary winding in opposite directions.

24. In a train control system, a receiver, a primary winding on the receiver normally energized with AC for producing flux, a secondary winding on the receiver, a control device in circuit with the secondary winding, two partial magnetic paths of unequal reluctance furnished by the receiver and both including the secondary winding tending to cause primary flux to flow through the secondary winding in opposite directions, and track-way means tending to change the relation of the reluctances of said paths to at least momentarily reduce said flux to substantially zero through said secondary winding.

25. In a train control system, a receiver, a primary winding on the receiver normally energized with alternating current, a secondary winding on the receiver, a control device in circuit with the secondary winding, two partial magnetic paths of unequal reluctance formed by the receiver and each including the secondary winding and arranged to cause flux produced by the primary winding to tend to flow through the secondary winding in opposite directions, and a trackway inductor adjustable to at times vary the relative values of the reluctances of said magnetic paths.

26. In a train control system, a receiver, a normally energized primary winding on the receiver to produce flux, a secondary winding on the receiver, the receiver itself having partial magnetic circuits of different reluctances, said primary winding being so arranged as to tend in differing degrees to send primary flux through the secondary winding in opposite directions.

27. In a train control system, a receiver, a primary winding on the receiver normally energized by alternating current to produce flux, a secondary winding on the receiver, the receiver in itself having magnetic circuits of different reluctances, said primary winding being so arranged as to tend in differing degrees to send primary flux through the secondary winding in opposite directions, and means for at times varying the relation between the differing degrees of tendency to send primary flux through the secondary winding to thereby modify the current induced in the secondary winding.

28. In a train control system, a car-carried receiver having a plurality of magnetic paths normally of unequal reluctance, a normally energized primary winding on the receiver, tending to send flux through said paths, a secondary winding included in both of said magnetic paths, a control device in circuit with the secondary winding, trackway means tending to change the relation of the reluctances of said paths to at least momentarily reduce said flux to substantially zero through said secondary winding, and means to tune the circuits of the primary and secondary windings to resonance.

29. In a train control system, a receiver, a normally energized primary winding on the receiver to produce flux, a secondary winding on the receiver, the receiver itself having partial magnetic circuits of different reluctances, said primary winding being so arranged as to tend in differing degrees to send primary flux through the secondary winding in opposite directions, and separate resonant circuits for the primary and secondary windings respectively.

30. In a train control system, a receiver, a secondary winding on the receiver, an electro-responsive device in circuit with said winding, a primary winding energized by alternating current for inducing a current in the secondary winding to supply current to said device, and track means to at times produce flux in the secondary winding opposing the normal flux in said secondary winding.

31. In a train control system, a receiver, a secondary winding on the receiver, a tuned circuit including the secondary winding, an electro-responsive device in circuit with said winding, a primary winding energized by alternating current for inducing a current in the secondary winding to supply current to said device, a tuned circuit including the primary winding and track means to at times produce flux in the secondary winding opposite the normal flux in such winding.

32. In a train control system, a secondary winding and a control device in series, a primary winding energized with alternating current and normally acting to produce flux in the secondary winding and thereby induce current therein to maintain said control device energized, and trackway means acting to cause said primary winding to tend to produce flux in the secondary winding in opposition to the normal flux and thereby reduce the induced current in said secondary winding and de-energize said control device.

33. In a train control system, a secondary winding and a control device in series in a tuned circuit, a primary winding energized with alternating current and normally acting to induce a current in said secondary winding and maintain said control device energized, said primary winding being included in a separate tuned circuit, and trackway means tending to produce flux from said primary winding in the secondary winding in opposition to the normal flux and thereby reduce the resultant flux in the secondary winding and de-energize said control device, said trackway means also acting to detune the circuits for said primary and secondary windings.

34. In an intermittent inductive train control system, a car carried receiver comprising a primary winding and a secondary winding normally unequally inductively coupled to said primary winding in two opposing directions, and trackway means for varying the inductive coupling in said directions.

35. In an intermittent inductive train control system, a vehicle carried receiver including means for emitting flux in a normal direction and also in one other direction, said receiver having a secondary core, a track element core substantially parallel with said other direction and adapted to tend to reverse flux in said secondary core, said normal direction being so provided in said receiver that ferrous objects on the trackway, if substantially at right angles to said other direction, will not tend to cause reversal of flux in said secondary core.

36. In an intermittent inductive train control system, a car carried receiver comprising a primary and a secondary winding inductively coupled, and trackway means including inductance and capacity for establishing a different inductive coupling between said primary and secondary windings to tend to change the direction of flux through said secondary winding.

37. In an intermittent inductive train control system, a car carried receiver comprising a primary and a secondary winding inductively coupled, and trackway means, including a reactor adjacent to a traffic controlled relay, for establishing a different inductive coupling between said primary and secondary windings to tend to change the direction of flux through said secondary winding.

38. In an intermittent inductive train control system, a car carried receiver comprising a primary and a secondary winding positioned to at times be inductively coupled to trackway means, said trackway means including reactive means adapted for storing energy inductively received from said primary winding and adapted for delivering said energy to said secondary coil by electro-magnetic induction at a time phase different from the time phase at which said reactive means receives said energy from said primary winding, said induction tending to control the direction of flux through said secondary winding whereby to obtain a clearing or stopping effect depending upon the direction of said phase shift.

39. In an intermittent inductive train control system, a car carried receiver comprising a primary and a secondary winding inductively coupled to trackway means, said trackway means including capacity and inductance adapted for storing energy inductively received from said primary winding and adapted for delivering said energy to said secondary coil by electro-magnetic induction at a time phase different from the time phase at which said capacity and inductance receives said energy from said primary winding, said capacity tending to enforce a leading phase angle of energy inductively transferred from said trackway means to said secondary winding of said receiver, and said inductance tending to enforce a lagging phase angle of energy inductively transferred from said trackway means to said secondary winding of said receiver for obtaining stopping and clearing effects respectively.

40. In an intermittent inductive train control system, a car carried receiver comprising a primary and a secondary winding inductively coupled to trackway means including phase angle control means adapted to tend to control the direction of flux cutting said secondary winding.

41. In an intermittent inductive train control system, a car carried receiver comprising a primary and a secondary winding inductively coupled to each other, and a track inductor inductively coupled to said primary winding, and trackway means including phase angle control means adapted to control the time phase whereby energy from said track inductor may be inductively transferred to said secondary winding of said receiver, and said track element being positioned relatively to said receiver to tend to geometrically reverse the direction of flux transmitted into said secondary winding from said primary winding through said track inductor.

42. In an intermittent inductive train control system, a car carried receiver comprising a primary winding producing magneto-motive-force and a secondary core, a secondary winding on said core, means controlled by said secondary winding, said secondary core being impressed with portions of said magneto-motive-force normally unequally from each of two opposite directions, and trackway means adapted to control one portion of said magneto-motive-force impressed on said secondary core.

43. In an intermittent inductive train control system having a car carried receiver comprising a primary coil on a primary core and a secondary coil on a secondary core whose flux is reversible by trackway means, and a coupling member controlling the amount of flux normally flowing in said secondary core.

44. In an intermittent inductive train control system having a car carried receiver comprising a primary coil on a primary core and a secondary coil on a secondary core whose flux is reversible by trackway means, and a coupling member controlling the relative coupling between primary and secondary cores laterally as compared to that longitudinally.

45. In an intermittent inductive train control system having a car carried receiver comprising a primary coil on a primary core and a secondary coil on a secondary core whose flux is reversible by trackway means, and a coupling member controlling the relative coupling between primary and secondary cores laterally as compared with that through said trackway means.

46. In a train controlling system, a source of alternating current on the vehicle, a receiver carried by the vehicle, said receiver comprising a primary coil and a secondary coil, an electro-responsive control member connected to said secondary coil, trackside means tending to reverse the direction of flux flowing through said secondary coil, and vehicle carried means for rendering said trackside means inoperative.

47. In a train controlling system, a source of alternating current on the vehicle, a vehicle carried receiver comprising a primary coil and a secondary coil, an electro-responsive control member connected to said secondary coil, trackside means tending to cause deenergization of said control member, and a manually controlled forestalling circuit connecting the source of alternating current to said electro-responsive control member whereby said trackside means may be rendered ineffective, current in said forestalling circuit being sufficient to retain said electro-responsive control member in normal position and insufficient to reset said control member.

48. In a train controlling system, a source of current on the vehicle, a vehicle carried receiver comprising a primary coil and a secondary coil, an electro-responsive control member connected to said secondary coil, trackside means tending to cause deenergization of said control member, and a manually controlled forestalling circuit connecting the source of current to said electro-responsive control member whereby said trackside means may be rendered ineffective, current in said forestalling circuit being sufficient to retain said electro-responsive control member in normal position and insufficient to reset said control member.

49. In a train controlling system, a source of current on the vehicle, a vehicle carried receiver comprising a primary coil and a secondary coil, an electro-responsive control member, roadside means adapted to tend to reverse the direction of flux through said secondary coil, and a reset circuit connecting said source of current to said control member for resetting said control member.

50. In an intermittent inductive train control system, a vehicle carried receiver comprising a normally energized primary coil and a secondary core traversed by flux from said primary coil, an electro-responsive control member on the vehicle, a track element adapted at times to tend to reverse flux in said secondary core whereby said electro-responsive control member is deenergized for a period sufficient to allow said control member to move to its restrictive position, and a vehicle carried source of alternating current of sufficiently high frequency to prevent said control member from moving to its restrictive position between half cycles except when traffic conditions require.

51. In an intermittent inductive train control system, a vehicle carried receiver comprising a primary coil and a secondary core traversed by flux from said primary coil, a track element adapted at times to tend to reverse flux in said secondary core, and a vehicle carried source of alternating current of sufficiently high frequency to substantially prevent solid magnetic masses on the trackway from materially tending to reverse flux in said secondary core.

52. In an intermittent inductive train control system, a vehicle carried receiver comprising primary poles and a secondary core, a track element core of iron adapted to substantially prevent eddy currents therein and adapted to reverse flux in said secondary core, said receiver primary poles being spaced sufficiently from each other that rails and other solid magnetic bodies on the trackway will develop enough more eddy currents than does said track element, to provide practical discrimination between said inductor and said solid magnetic bodies.

53. A magnetic receiver comprising a primary winding and a secondary winding normally unequally inductively coupled to said primary winding in two opposing directions, and a control device connected to said secondary winding.

54. A magnetic receiver comprising a secondary winding and a control device in series, and a primary winding energized with alternating current and normally acting to produce flux in one direction in the secondary winding and thereby induce current therein to maintain said control device energized, the presence of a body of inert magnetic material in proximity to the receiver being operable whereby primary flux is caused to flow in the opposite direction in the secondary winding to reduce the induced current therein and de-energize said control device.

55. A magnetic receiver comprising a core, a normally energized primary winding on the core for producing flux, a secondary winding on the core, and a control device in circuit with the secondary winding, said core providing two partial magnetic paths of unequal reluctance and each including the secondary winding, and tending to cause flux produced by the primary winding to flow through the secondary winding in opposite directions.

56. A magnetic receiver comprising a core, a single normaly energized primary winding on the core to produce flux, a secondary winding on the core, a control device in circuit with the secondary winding, said core providing partial magnetic circuits of different reluctances arranged so as to tend in differing degrees to send primary flux produced by said primary winding through the secondary winding in opposite directions to produce in the secondary winding a net current sufficient to retain said control device operative.

57. The combination with a circuit to be controlled, of a magnetic detector for controlling the operation of the circuit comprising a core having an energized primary winding and a secondary winding inductively coupled together in opposing directions and acting under balanced and unbalanced conditions and normally acting under one of said conditions, the conditions in the circuit of the secondary winding being altered by a change from said normal condition effected by the presence of a magnetic conductor in the magnetic field of said core.

58. The combination with a circiut to be controlled and a control device for said circuit, of a detector for controlling the operation of said device comprising a core having an energized primary winding and a secondary winding inductively coupled together in opposing directions and creating a plurality of paths for the magnetic flux produced by said primary winding, the control device being connected in the circuit of the secondary winding and operated by a change in such circuit effected by the presence of a magnetic conductor coming into at least one of the paths of the magnetic flux of the core.

59. The combination with a circuit to be controlled and a control device for operating said circuit, of a detector for controlling the operation of said device comprising a core having an energized primary winding and a secondary winding inductively coupled together in opposite directions, said control device being connected in the circuit of said secondary winding, the core having a plurality of pairs of separated poles providing a plurality of magnetic flux paths whereby conditions in the circuit of the secondary winding are modified and the control device operated by a small variation in the flow of flux in one of the flux paths effected by the presence of a magnetic conductor brought into the influence of the flux flowing through at least one of said paths through a wide air gap.

60. Apparatus of the character described comprising a magnetic receiver and armature means, one of such elements being arranged in the road over which a vehicle travels and the other being movable with the vehicle, the receiver comprising a pair of cores magnetically coupled together in opposing directions and operative under different conditions between a substantially unbalanced condition and a condition approaching substantial balance, and normally acting under one of such conditions, the conditions in the receiver being changed from the normal condition to the other condition by changes in the magnetic coupling between the cores effected by the presence of the armature means in the magnetic field of said cores.

61. Apparatus of the character described comprising a magnetic receiver and armature means, one of such elements being arranged in the road over which a vehicle travels and the other being movable with the vehicle, the receiver comprising a pair of cores, a primary coil and a secondary coil mounted on the respective cores, the primary coil being constantly energized, said cores being magnetically coupled together in opposing directions and operative under different conditions between a substantially unbalanced condition and a condition approaching substantial balance, and normally acting under one of such conditions, and a control device in series with the secondary coil, the conditions in the receiver being changed from the normal condition to the other condition by changes in the magnetic coupling between the cores effected by the presence of the armature means in the magnetic field of said cores.

62. A magnetic receiver comprising a core, a normally energized primary winding on the core to produce flux, a secondary winding on the core, a control device in circuit with the secondary winding, said core providing partial magnetic circuits of different reluctances arranged so as to tend in differing degrees to send primary flux, originating at one place in said core, through the secondary winding, in opposite directions, to produce in the secondary winding a net current sufficient to retain said control device operative.

In testimony whereof I affix my signature.

PHILIP X. RICE.